United States Patent Office 3,776,894
Patented Dec. 4, 1973

3,776,894
PROCESS FOR THE MANUFACTURE OF SUSPENSION POLYVINYL CHLORIDE OF POROUS STRUCTURE AND HIGH APPARENT DENSITY
Arno Czekay, Knapsack, Bruno Krämer, Hurth, and Karl Kaiser, Bruhl, Germany, assignors to Knapsack Aktiengesellschaft, Knapsack, near Cologne, Germany
No Drawing. Filed Mar. 8, 1971, Ser. No. 122,090
Claims priority, application Germany, Mar. 24, 1970,
P 20 14 015.2
Int. Cl. C08f 3/22
U.S. Cl. 260—92.8 W          2 Claims

ABSTRACT OF THE DISCLOSURE

Production of polyvinyl chloride of porous structure and high apparent density, vinyl chloride is polymerized in suspension with agitation, in a closed reactor, in aqueous phase, at a temperature of between 50 and 65° C., in contact with a monomer-soluble activator and a protective colloid. More particularly, agitation of the polymerization batch is interrupted 10 to 20 minutes after the start of the polymerization, for a period of between 0.5 and 1.5 hours, and agitation is resumed after that period and the polymerization is completed.

---

The present invention relates to the production of polyvinyl chloride or porous structure and high apparent density by subjecting vinyl chloride to polymerization in suspension, in contact with an activator and a protective colloid, while maintaining a predetermined stirring program during polymerization.

It has already been reported that polyvinyl chloride having a porous structure can be produced by a plurality of individual polymerization reactions in suspension which, however, differ significantly from each other. As a result of its porous structure polyvinyl chloride is more particularly easy to blend later with high proportions of softeners with the resultant formation of a so-called "dry blend powder," which is dry and has good flow properties. In addition thereto, articles made from dry blend PVC have a surface free from spots, and they are good insulators.

German published specification 1,495,549 describes a process for making suspension polyvinyl chloride with a porous structure in the presence of protective colloids, wherein the polymerization is started with slow agitation in the non-dispersed organic phase until conversion of 5% of the vinyl chloride use, and then completed with intense agitation and while dispersing the organic phase in water. A preferred feature of this process comprises adding between 0.01 and 0.1 weight percent of ammonia to the aqueous phase, and using methyl cellulose, polyvinyl alcohol, gelatin or a suitable mixture thereof as the protective colloids in a proportion of up to 0.15 weight percent, based on vinyl chloride. While the polyvinyl chloride so made has a good porous structure, the fact remains that it has no satisfactory apparent density. It is known that the density and hence the apparent density of particulate polyvinyl chloride decrease as the porosity thereof increases. On the other hand, however, it is highly desirable to obtain high PVC-throughput rates on subjecting dry blend PVC to treatment in processing machinery. This, however, is only possible if use is made of PVC-powder which has an apparent density as high as possible.

It is therefore an object of the present invention to produce suspension polyvinyl chloride with a porous structure and high apparent density of at least about 460 grams/liter, preferably 470 grams/liter. An index of the porous structure is the power for absorbing softener which should be at least as high as 28 weight percent, based on the quantity of powdered PVC. The quantity of softener absorbed is determined by means of a centrifugation test. This object of the present invention is achieved by means of a well-defined stirring program which is maintained during the polymerization.

The step of maintaining a given stirring program in the suspension polymerization of vinyl chloride has already been described in German published specification 1,076,373. However, the process described therein relates to the production of fairly small polymer particles with a size of between 0.5 and 5 microns, that can be made into PVC-softener pastes, rather than to the production of porous-structured PVC. This conventional process substantially comprises the steps of operating the agitator, prior to and/or while heating the polymerization batch to polymerization temperature, for a period of between 10 and 120 minutes at a peripheral velocity of between 7 and 15 meters/second, successively reducing the said velocity down to a value of between 50 and 10% of the initial velocity, and maintaining the reduced velocity until the polymerization is complete. Experience has shown, however, that the polymers so made have a low apparent density and practically no flowability, and this is in clear contrast with the problem underlying our present invention.

The process of the present invention for the manufacture of polyvinyl chloride having a porous structure and a high apparent density by polymerization in suspension wherein vinyl chloride is polymerized with agitation, in a closed reactor, in aqueous phase, at temperatures of between about 50 and 65° C., in contact with a monomer-soluble activator and a protective colloid, and the resulting polymer, which may be cooled, if desired, is isolated and dried, comprises more particularly arresting agitation of the polymerization batch about 10 to 20 minutes, preferably about 15 minutes, after the start of the polymerization, for a period of time of between 0.5 and 1.5 hours, preferably about 1 hour, and after that period resuming agitation and completing the polymerization.

A preferred feature of the present invention comprises starting the polymerization with the use of an activator concentration of between about 0.01 and 0.03 weight percent, preferably 0.02 weight percent, based on the quantity of vinyl chloride. Within this range of activator concentration, the reaction heat evolved during polymerization, especially when the agitator is at standstill, remains within the limits outside which the thermal stability and K-value of the polymer begin to decrease. The activators useful in the suspension polymerization of the present invention include, for example, tertiary butyl perpivalate, diisopropylperoxidicarbonate, acetylcyclohexane-sulfonyl peroxide and commercial low temperature activators.

The activator is required to be used in combination with a protective colloid, which is added to the polymerization batch. The preferred colloids include, for example, cellulose gum, polyvinyl alcohol, polyglycol ether and partially saponified polyvinyl acetate with a residual acetyl content of between about 18 and 24%, preferably 21%.

A further factor which is critical for successful operation and adds to the steps described hereinabove, is the polymerization temperature, which should preferably be situated at about 55° C.

A further preferred feature of the present invention comprises producing porous-structured polyvinyl chloride having a high apparent density of at least about 460 grams/liter, preferably 470 grams/liter, and a K-value of between about 60 and 75, preferably 70. Still further, the PVC should absorb at least 28 weight percent of softener, based on the PVC-powder quantity.

In clear contrast with conventional processes, the present invention enables the production of polyvinyl chloride having a porous structure and high apparent density, which is a very desirable step forward in the art. A product which combines these two properties is particularly well adapted for use in the manufacture of dry blend PVC. It was in no way obvious to try the stirring program in the process of the present invention as the continuous abstraction of heat by constant agitation of the polymerization batch has long been held in the art to be the only way of mastering a polymerization reaction, once it has been initiated. This has turned out unfounded in the process of the present invention. In addition thereto and contrary to what would have been expected, the polymerization mixture does not tend to agglomerate, nor could articles made therefrom be found to be spotty.

The following examples further illustrate the process of the present invention, which, however is not limited to the exemplary embodiments described therein.

EXAMPLE 1 (COMPARATIVE EXAMPLE)

An agitator autoclave fitted with an infinitely variable impeller mixer was fed with the following components:

1,500 liters of water freed from salt,
750 liters of vinyl chloride,
800 grams of partially acetylized polyvinyl alcohol, and
100 grams of diisopropylperoxidicarbonate.

The polyvinyl alcohol contained between 18 and 24% of acetyl groups and was dissolved in water. Prior to the introduction of vinyl chloride, the autoclave was scavenged with nitrogen. The activator was dissolved in vinyl chloride. The autoclave was closed and the polymerization reaction initiated by heating the polymerization batch to a temperature of 55° C. with agitation. The polymerization was terminated after 10 hours comprising the period which lapsed from the moment at which the polymerization batch was at reaction temperature until the pressure prevailing in the autoclave began to drop down to 5 atmospheres gauge.

The resulting polymer was tested. The test result which were found to correspond to those determined for a commercial dry blend PVC-powder, are indicated in the table hereinafter.

EXAMPLE 2 (COMPARATIVE EXAMPLE)

The procedure was the same as that described in Example 1, save that 133 grams of diisopropylperoxidicarbonate were used. The pressure began to drop down to 5 atmospheres gauge and this indicated the end of the reaction, after 9 hours.

The characteristic data of the polymer so made are indicated in the table hereinafter. As compared with the data determined in Example 1, they were within the limits of error of the testing methods.

EXAMPLE 3 (PROCESS OF INVENTION)

The procedure was the same as that described in Example 2, save that the agitation of the polymerization batch was interrupted 15 minutes after the start of the polymerization, for a period of 65 minutes. After that period, the polymerization was terminated. The resulting PVC-powder was tested. The test results are indicated in the table hereinafter.

EXAMPLE 4 (COMPARATIVE EXAMPLE)

The procedure was the same as that described in Example 2, save that the polymerization was initiated without agitation. As a result, phase separation existed between the vinyl chloride and aqueous phase. Agitation was started after 15 minutes with the result that the two phases were intimately mixed together, and maintained until the polymerization was terminated. The resulting PVC-powder was tested. The test results are indicated in the following table.

TABLE

| Properties | Example 1 | Example 2 | Example 3 | Example 4 |
|---|---|---|---|---|
| K-value | 69.8 | 70.3 | 70.1 | 69.9 |
| Apparent density (g./l.) | 435 | 430 | 475 | 445 |
| Flowability (sec./100 g. powder) | 14.2 | 14.3 | 12.8 | 12.1 |
| Particle size distribution (percent <160 μ) | 95 | 95 | 95 | 79 |
| Absorption of softener (percent) | 28.5 | 29.2 | 28.8 | 27.3 |
| Number of spots | 0–1 | 0–1 | 0–1 | 0–2 |

With reference to the table:

The proportion of softener absorbed by the polyvinyl chloride was determined by means of a centrifugation test. To this end, the polyvinyl chloride was made into a paste using an excess of softener, and the paste was allowed to stand for 10 minutes at room temperature. Following this, the non-absorbed softener was removed by means of a centrifuge rotating at a speed of 10,000 r.p.m. The quantity of softener absorbed per 100 grams of polyvinyl chloride is an index of its absorption power.

The number of spots was determined on a 100 square centimeter PVC-sheet 0.2 mm. thick, after rolling for 10 minutes at 160° C.

A comparison of the test results summarized in the above table and determined for the polymers obtained in Examples 1 to 4 shows that the present step of interrupting agitation at a given moment during the polymerization of vinyl chloride has beneficial effects upon the apparent density in the absence of adverse effects upon the other properties of the polymers. Example 4, which describes a process approaching that reported in German published specification 1,495,549, shows the influence which the timed interruption of agitation has upon the apparent density and softener absorption power of the polymer. As can be seen the apparent density and softener absorption power were reduced when the polymerization was started without agitation.

What is claimed is:

1. In the process for the manufacture of polyvinyl chloride having a porous structure and a high apparent density by polymerization in suspension, wherein vinyl chloride is polymerized with agitation, in a closed reactor, in aqueous phase, at a temperature of between 50 and 65° C., in contact with 0.01–0.03 weight percent of diisopropylperoxidicarbonate as activator and partially acetylized polyvinyl alcohol, containing between 18 and 24% of acetyl groups as protective colloid, and the resulting polymer, which may be cooled, if desired, is isolated and dried, the improvement which comprises arresting agitation of the polymerization batch 15 minutes after the start of the polymerization, for a period of time of 65 minutes and after that period resuming agitation and completing the polymerization.

2. In the process for the manufacture of polyvinyl chloride having a porous structure and a high apparent density by polymerization in suspension, wherein vinyl chloride is polymerized with agitation, in a closed reactor, in aqueous phase, at a temperature of 55° C., in contact with 0.02 weight percent of diisopropylperoxidicarbonate as activator and partially acetylized polyvinyl alcohol, containing 21% of acetyl groups as protective colloid, and the resulting polymer, which may be cooled, if desired, is isolated and dried, the improvement which comprises arresting agitation of the polymerization batch 15 minutes after the start of the polymerization, for a period of time of 65 minutes and after that period resuming agitation and completing the polymerization.

References Cited

UNITED STATES PATENTS 3,544,539  12/1970  Koyanagi et al. ___ 260—92.8 W

JOSEPH L. SCHOFER, Primary Examiner

R. S. BENJAMIN, Assistant Examiner